United States Patent [19]

Saylor

[11] 4,132,557
[45] Jan. 2, 1979

[54] TECHNIQUE FOR HANDLING AND TRANSPORTING CEMENT

[76] Inventor: Arthur D. Saylor, 521 E. Merced Ave., West Covina, Calif. 91790

[21] Appl. No.: 704,312

[22] Filed: Jul. 12, 1976

[51] Int. Cl.² ............................................... C04B 7/02
[52] U.S. Cl. ..................................... 106/100; 214/15 B
[58] Field of Search ............... 106/100, 103; 214/15 B

[56] References Cited

U.S. PATENT DOCUMENTS

| | | | |
|---|---|---|---|
| 1,465,863 | 8/1923 | Pioda | 106/100 |
| 2,162,525 | 6/1939 | Breerwood | 106/100 |
| 3,686,372 | 8/1972 | Hiatt et al. | 106/100 |
| 3,954,491 | 5/1976 | Adrian et al. | 106/100 |

Primary Examiner—R. Dean
Assistant Examiner—John P. Sheehan
Attorney, Agent, or Firm—George J. Netter

[57] ABSTRACT

The powdered, blended, cement ingredients are stored and/or shipped prior to kilning and after being brought to the general region of use are then heated to the required temperature to obtain the desired characteristics of cement (i.e., the ability to harden). A further aspect is that the unkilned cement ingredients, either as a slurry when made by a "wet" process or formed into a slurry when made by a "dry" process, are shipped in an oil tanker during what is typically a dead-head run (e.g., from the United States to the Near East). Thinner is added to the slurry, reducing its viscosity and thereby making it easier to pump into and out of the tanker holds.

6 Claims, 1 Drawing Figure

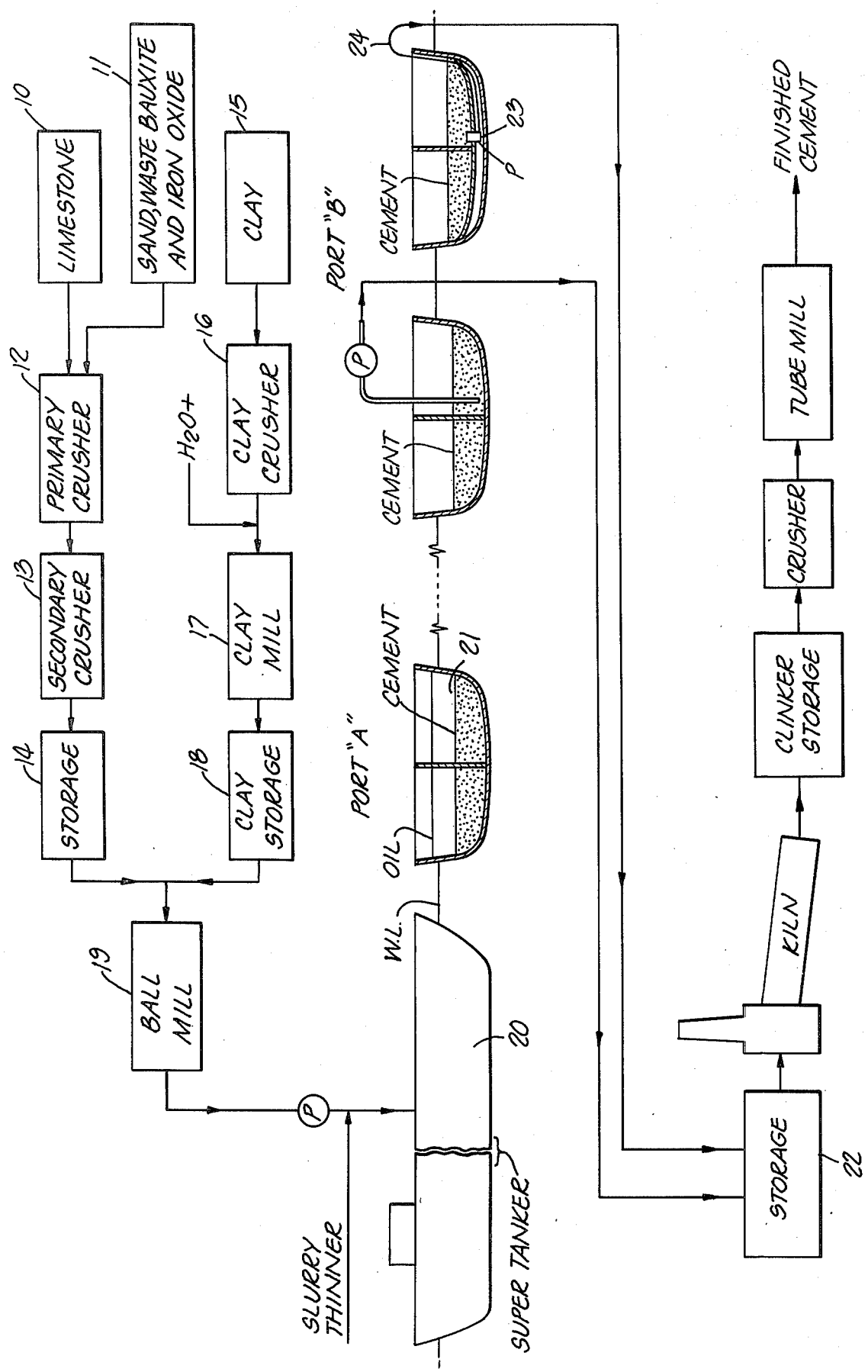

TECHNIQUE FOR HANDLING AND TRANSPORTING CEMENT

The present invention pertains generally to a technique of handling and transporting cement, and, more particularly, to such a technique enabling the extended storage and shipment of cement without the frequently encountered inconvenience and loss associated with moisture absorption.

BACKGROUND OF THE INVENTION

In the past the storage and transportation of pulverulent cement has been subject to significant losses resulting from water absorption causing the cement to set up. That is, special measures such as waterproof packaging or dehydrating the ambient atmosphere have been adopted previously to avoid having a substantial fraction of cement harden during extended storage and shipment.

These storage and transportation difficulties are even more severe when it is necessary to transport the cement over relatively long distances. For example, the only practical way of providing cement in commercial quantities from, say, the United States or Europe to a Near East or North African user, is by ship. However, not only has this required in the past dealing with the continuing possibility of moisture absorption during a long ship voyage, but also, because of the relatively great bulk of cement, conventional ship transport leaves much to be desired.

SUMMARY OF THE INVENTION

In the production of cement, whether by a "dry" or "wet" process, one of the final steps is to heat the powdered ingredients to a temperature in excess of approximately 2600° F., after which the cement achieves its primary characteristic of being able to set up into a hard, stonelike condition on mixing with water and various ingredients, followed by thorough drying. In the practice of a primary aspect of this invention, the powdered cement ingredients are stored and/or shipped prior to the kilning step and, when brought to the general region of use, are then heated to the required temperature to provide the final cement.

A further aspect is that the unkilned cement ingredients, either as a slurry when made by a "wet" process or formed into a slurry when made by a "dry" process, are shipped in an oil tanker during what is typically a deadhead run (e.g., from the United States to the Near East). A thinner is added to the slurry, reducing its viscosity and thereby making it easier to pump into and out of the tanker holds.

DESCRIPTION OF THE DRAWING

The drawing is a schematic depiction of the various processing and handling steps of this invention.

DESCRIPTION OF A PREFERRED EMBODIMENT

The primary ingredients and relative proportions of so-called Portland cement are: 60% lime; 25% silica; 10% alumina; and the remainder iron oxide and gypsum. Since the major ingredient is lime, most cement plants are located near a limestone quarry and the other materials are usually brought to the plant by train or truck. The United States produces, at this time, about one-fifth of the world's total of cement, with other major producers being Russia, West Germany, Japan, Great Britian, Italy and France.

It is clear that the newly emerging nations of Africa and the Near East, for example, who have great need for cement to use in the construction of roads, buildings and the like, must import their cement from one or more of the producing nations. This entails shipping over relatively great distances with concomitant difficulties already alluded to, and it is primarily to alleviate these difficulties and to provide an economically feasible transportation process that the present invention was conceived, and in which regard it has it most significant advantages.

With reference now to drawing, the various steps in what is sometimes referred to as a "wet" process of producing cement are shown in function block form along the top of the drawing. Thus, without regard to details, the quarried limestone 10, which may include limestone rocks as large as a grand piano, are mixed with sand, waste bauxite and iron oxide enumerated as at 11 and initially sized in a primary crusher 12. Following this, the materials are further reduced in size in a secondary crusher 13 to approximately ¾ inch pieces. Temporary storage is provided at 14 for the output of 13. At the same time, clay from a suitable source 15 is passed through a crusher 16, mixed with water, milled at 17 and then temporarily stored at 18. The materials stored at 14 and 18 are mixed as a slurry and still further reduced in size in a ball mill 19.

The properly blended and sized, but unkilned and therefore unfinished cement materials in slurry form are then transported in a conventional manner (e.g., by truck or train) to a shipping port A for temporary storage or immediate transportation. Since the cement ingredients at this time have not been kilned, they will not set up or harden even if inadvertently allowed to dry.

In preparation for shipping, unkilned cement components slurry is admixed with a suitable slurry thinner to reduce its viscosity. Although other thinners may be found satisfactory, the thinner sold under the trade designation of Orzan A (an ammonium lignin sulfonate), by Crown Zellerbach Corporation, Camas, Wash., is excellent for this purpose.

The so-thinned slurry is now easily pumped into the empty hold of an oil tanker 20, using the same pumping equipment normally utilized for crude oil. Although powdered cement is considerably more dense than crude oil, when in slurry form it is easily pumped, particularly when thinned as described. In addition, although some variation in slurry density can be accommodated by pumping apparatus, when a tanker is provided with that amount of slurry having the same weight as a full load of oil, the height of the cement in the ship hold or tanks is approximately one-half of a full load of oil as shown at 21.

After shipment of the cement slurry to a user location (Port B), the slurry is then removed by conventional pumping apparatus P and temporarily stored in a conventional manner as at 22. The storage will in most cases be at the docks of Port B, after which it is moved by truck, train or conveyor apparatus, as the case may be, to a kiln where the slurry is fired at an elevated temperature (1600°–2710° F.), which converts the materials to a substance known as clinker. The clinker is then crushed and ground in a tube mill to a very fine powder of a consistency approximating that of flour and this is the finished cement.

There are certain types of tankers referred to as OBO's (Ore/Bulk/Oil) which are preferred for the practice of this invention. Such ships have a double bottom and cargo materials are removed by a pumping apparatus 23, located at the bottom of the hold. Thus, as enumerated as 24, the cement ingredients slurry is shown in process of being pumped from an OBO. A major reason for preferring an OBO for use in the process of this invention is that the hold pumping arrangement is from the bottom, thereby reducing the problem of materials left in the lower part of the tanks that could possible be considered a contaminant. That is, as compared to the more conventional tanker which pumps from the top and therefore leaves a residue in the tanks, an OBO can remove substantially all of the materials from its tanks.

If cement is made according to a "dry" process, the unkilned, mixed and sized cement components are formed into a slurry which is pumped into the ship hold as before. Also, it is important that a suitable thinner be added to the slurry.

Not only does transporting cement ingredients in the manner described and finishing processing at the remote location of the user have the advantages given, but also the problem of contamination is minimal, either from or to the cement materials. For example, any oil that remains in the hold and is picked up by cement ingredients is quickly burned in the subsequent kiln firing. Also, any cement ingredients that become entrained in the crude oil are minimal and do not pose a contamination problem in subsequent processing.

I claim:

1. A method of making cement available at a first geographical location when the cement components are mixed and sized at a second geographical location substantially distant from said first location, comprising the steps of:
   forming a slurry of the sized and mixed cement components at the second location;
   loading the slurry into a transportation vehicle at the second location;
   moving the loaded transportation vehicle to the second location;
   unloading the slurry from the vehicle at the first location; and
   heating the slurry to such temperature and for such length of time as to convert said slurry to dry powdered cement.

2. A method as in claim 1, in which there is provided the further step of adding a viscosity reducing agent to the slurry prior to loading onto the vehicle.

3. A method as in claim 2, in which the transportation vehicle is a ship having a hold, and the method includes pumping the slurry into the ship hold, moving the ship to the first location, and pumping the slurry from the ship hold to a storage facility.

4. A method as in claim 2, in which the transportation vehicle is an oil tanker and the method includes loading the slurry into the hold of the oil tanker, moving the tanker to the first location which is an oil producing region and unloading the slurry in said first location, whereby the oil tanker is utilized during a normally dead-head trip.

5. A method of manufacturing cement for ultimate use at a first location remote from a second location which includes the source of cement component materials, said first and second locations being interconnected by a navigable body of water, comprising:
   sizing and blending the cement components to form a generally powderlike mixture at the first location;
   mixing the cement components mixture with water and a viscosity modifying agent to form a slurry;
   pumping the slurry into the hold of a ship disposed on the body of water;
   transporting the slurry loaded ship to the first location;
   pumping the slurry from the ship hold to a shore-based facility at the first location;
   heating the slurry to form clinkers; and
   milling the clinkers to a finely ground consistency.

6. A method as in claim 5, in which the viscosity modifying agent is ammonium lignin sulfonate.

* * * * *